US010901413B2

United States Patent
Yeung et al.

(10) Patent No.: US 10,901,413 B2
(45) Date of Patent: Jan. 26, 2021

(54) SYSTEM AND METHOD FOR CONTROLLING OPERATION OF AN AUTONOMOUS VEHICLE

(71) Applicant: City University of Hong Kong, Kowloon (HK)

(72) Inventors: Kai Hau Alan Yeung, Kowloon (HK); Moshe Zukerman, Kowloon (HK)

(73) Assignee: City University of Hong Kong, Kowloon (HK)

( * ) Notice: Subject to any disclaimer, the term of this patent is extended or adjusted under 35 U.S.C. 154(b) by 261 days.

(21) Appl. No.: 16/007,065

(22) Filed: Jun. 13, 2018

(65) Prior Publication Data

US 2019/0384289 A1 Dec. 19, 2019

(51) Int. Cl.
*G05D 1/00* (2006.01)
*G05D 1/02* (2020.01)
*H04L 29/06* (2006.01)

(52) U.S. Cl.
CPC .......... *G05D 1/0077* (2013.01); *G05D 1/0088* (2013.01); *G05D 1/0285* (2013.01); *H04L 63/145* (2013.01)

(58) Field of Classification Search
CPC .. G05D 1/0077; G05D 1/0088; G05D 1/0285; H04L 63/145
See application file for complete search history.

(56) References Cited

U.S. PATENT DOCUMENTS

| | | | |
|---|---|---|---|
| 2015/0248131 A1* | 9/2015 | Fairfield | G05D 1/0038 701/2 |
| 2019/0220010 A1* | 7/2019 | Leonard | B60W 50/14 |

OTHER PUBLICATIONS

J. Petit, et al. "Potential Cyberattacks on Automated Vehicles". IEEE Transactions on Intelligent Transportation Systems, vol. 16, Iss.2, pp. 546-556, 2015.
A. M. Wyglinski, et al. "Security of Autonomous Systems Employing Embedded Computing and Sensors". IEEE Micro, vol. 33, Iss.1, pp. 80-86, Jan.-Feb. 2013.
Jesus Pacheco, et al. "IoT Security Development Framework for building trustworthy Smart car services". Proc. of IEEE Conference on Intelligence and Security Informatics (ISI), Tucson, USA, Sep. 2016.
K. M. Ali Alheeti, et al. "Intelligent Intrusion Detection of Grey Hole and Rushing Attacks in Self-Driving Vehicular Networks". Computers, vol. 5, Iss.3, 2016.

* cited by examiner

*Primary Examiner* — Michael D Lang
(74) *Attorney, Agent, or Firm* — Renner Kenner Greive Bobak Taylor & Weber

(57) ABSTRACT

A method for controlling operation of an autonomous vehicle includes: comparing, at a remote computing system operably connected with a processor in the autonomous vehicle, a first signal indicative of an environment in which the autonomous vehicle is arranged and a second signal indicative of the environment in which the autonomous vehicle is arranged; and generating a restriction command to restrict operation of the autonomous vehicle if the comparison indicates that the first signal and the second signal do not correspond. The first signal is determined by the processor in the autonomous vehicle and the second signal is determined by the remote computing system.

25 Claims, 4 Drawing Sheets

SYSTEM AND METHOD FOR CONTROLLING OPERATION OF AN AUTONOMOUS VEHICLE

TECHNICAL FIELD

The present invention relates to a system and method for controlling operation of an autonomous vehicle. Particularly, although not exclusively, the invention relates to a system and method for improving safety control of an autonomous vehicle.

BACKGROUND

To reduce road related accidents due to human (driver) errors, self-driving cars and autonomous vehicles are developed. In one application, autonomous vehicles can be connected to each other and to central controller, to form connected autonomous vehicles. Safety is the main concern with operation of the autonomous vehicles. For autonomous vehicles to be safe, it is required that, with very high level of certainty, the vehicle will reach its destination without collision with any other vehicles or obstacles throughout its travel.

Despite efforts to improve safety of operation of autonomous vehicles using detection schemes and anomaly behavior analysis, autonomous vehicles remain prone to cyberattacks, as well as tampering by malware and viruses. These factors are detrimental to the safe operation of autonomous vehicles.

SUMMARY OF THE INVENTION

It is an object of the invention to address the above needs, to overcome or substantially ameliorate the above disadvantages or, more generally, to provide a system and method for controlling operation of an autonomous vehicle.

Accordingly, the present invention, in the first aspect, provides a method for controlling operation of an autonomous vehicle, comprising: comparing, at a remote computing system operably connected with a processor in the autonomous vehicle, a first signal indicative of an environment in which the autonomous vehicle is arranged and a second signal indicative of the environment in which the autonomous vehicle is arranged; and generating a restriction command to restrict operation of the autonomous vehicle if the comparison indicates that the first signal and the second signal do not correspond; wherein the first signal is determined by the processor in the autonomous vehicle, and the second signal is determined by the remote computing system.

Preferably, the operation restriction includes at least one of: restricting travel of the autonomous vehicle, stopping the autonomous vehicle, and disabling a function of the autonomous vehicle.

In one embodiment of the first aspect, the method may further comprise transmitting the first signal from the autonomous vehicle to the remote computing system.

Preferably, the generation step is performed at the remote computing system. More preferably, the method further comprises transmitting the restriction command to the autonomous vehicle.

Alternatively, the generation step is performed at the autonomous vehicle.

In one embodiment of the first aspect, the method further comprises determining the first signal based on processing a sensing signal obtained from a first sensor on the autonomous vehicle; and determining the second signal based on processing a sensing signal obtained from a second sensor on the autonomous vehicle; wherein the first and second sensors are of the same type, and are arranged to sense an environment in which the autonomous vehicle is arranged. Each of the first and second sensors may comprise an optical sensor, an electric sensor, an electromagnetic sensor, or an ultrasonic sensor.

In another embodiment of the first aspect, the method further comprises determining the first signal based on processing a sensing signal obtained from a sensor on the autonomous vehicle; and determining the second signal based on processing a sensing signal obtained from the sensor on the autonomous vehicle; wherein the sensor is arranged to sense an environment in which the autonomous vehicle is arranged. The sensor may comprise an optical sensor, an electric sensor, an electromagnetic sensor or an ultrasonic sensor.

In a preferred embodiment of the first aspect, the remote computing system comprises a cloud computing system.

In one embodiment of the first aspect, the method may further comprise generating a control command to control operation of the autonomous vehicle if the comparison indicates that the first signal corresponds to the second signal; wherein the control command comprises a response to be performed by the autonomous vehicle that is responsive to the environment in which the autonomous vehicle is arranged.

Preferably, the generation step is performed at the remote computing system. More preferably, the method further comprises transmitting the control command to the autonomous vehicle.

Alternatively, the generation step is performed at the autonomous vehicle.

Preferably, the method further comprises generating an alarm if the comparison indicates that the first signal and the second signal do not correspond. The alarm may be generated at the autonomous vehicle, or may be provided to an information handling system (phone, tablet, desktop computer, notebook computer, etc.) operably connected with the remote computing system.

In the second aspect, the present invention provides a system for controlling operation of an autonomous vehicle, comprising a processor at a remote computing system, operably connected with a processor in the autonomous vehicle, arranged to: compare a first signal indicative of an environment in which the autonomous vehicle is arranged and a second signal indicative of the environment in which the autonomous vehicle is arranged; and generate a restriction command to restrict operation of the autonomous vehicle if the comparison indicates that the first signal and the second signal do not correspond; wherein the first signal is determined by the processor in the autonomous vehicle, and the second signal is determined by the remote computing system.

Preferably, the operation restriction includes at least one of: restricting travel of the autonomous vehicle, stopping the autonomous vehicle, and disabling a function of the autonomous vehicle.

In one embodiment of the second aspect, the first signal is determined based on processing a sensing signal obtained from a first sensor on the autonomous vehicle; and the second signal is determined based on processing a sensing signal obtained from a second sensor on the autonomous vehicle; wherein the first and second sensors are of the same type, and are arranged to sense an environment in which the autonomous vehicle is arranged. Each of the first and second sensors may comprise an optical sensor, an electric sensor, an electromagnetic sensor, or an ultrasonic sensor.

In another embodiment of the second aspect, the first signal is determined based on processing a sensing signal obtained from a sensor on the autonomous vehicle; and the second signal is determined based on processing a sensing signal obtained from the sensor on the autonomous vehicle; wherein the sensor is arranged to sense an environment in which the autonomous vehicle is arranged. The sensor may comprise an optical sensor, an electric sensor, an electromagnetic sensor, or an ultrasonic sensor.

In a preferred embodiment of the second aspect, the remote computing system comprises a cloud computing system.

Preferably, the processor at the remote computing system is further arranged to: generate a control command to control operation of the autonomous vehicle if the comparison indicates that the first signal corresponds to the second signal; wherein the control command comprises a response to be performed by the autonomous vehicle that is responsive to the environment in which the autonomous vehicle is arranged.

In the third aspect, the present invention provides a method for controlling operation of an autonomous vehicle, comprising: transmitting, to the remote computing system operably connected with the autonomous vehicle, a first signal indicative of an environment in which the autonomous vehicle is arranged; transmitting, to the remote computing system, a sensing signal obtained from a sensor on the autonomous vehicle to the remote computing system for determination of a second signal indicative of the environment in which the autonomous vehicle is arranged; and receiving, from the remote computing system, a restriction command when the remote computing system determines that the first signal and the second signal do not correspond; wherein the sensor is arranged to sense an environment in which the autonomous vehicle is arranged; and wherein the first signal is determined by the processor in the autonomous vehicle.

Preferably, the operation restriction includes at least one of: restricting travel of the autonomous vehicle, stopping the autonomous vehicle, and disabling a function of the autonomous vehicle.

In one embodiment of the third aspect, the method may further include: processing, at a processor in the autonomous vehicle, a sensing signal obtained from a sensor on the autonomous vehicle to determine the first signal.

Preferably, the sensor providing the sensing signal to be processed to provide the first signal and the sensor providing the sensing signal to be processed to provide the second signal are of the same type, and are arranged to sense an environment in which the autonomous vehicle is arranged.

More preferably, the sensor providing the sensing signal to be processed to provide the first signal is the sensor providing the sensing signal to be processed to provide the second signal. The sensor may comprise an optical sensor, an electric sensor, an electromagnetic sensor, or an ultrasonic sensor.

In a preferred embodiment of the third aspect, the remote computing system comprises a cloud computing system.

Preferably, the method further includes: receiving, from the remote computing system, a control command to control operation of the autonomous vehicle when the remote computing system determines that the first signal corresponds to the second signal; wherein the control command comprises a response to be performed by the autonomous vehicle that is responsive to the environment in which the autonomous vehicle is arranged.

Preferably, the method further includes generating an alarm when the remote computing system determines that the first signal and the second signal do not correspond.

In the fourth aspect, the present invention provides a system for controlling operation of an autonomous vehicle, comprising: an autonomous vehicle including a sensor is arranged to sense an environment in which the autonomous vehicle is arranged, a processor, and a communication module that are operably connected with each other; wherein the communication module is arranged to: transmit, to a remote computing system operably connected with the autonomous vehicle, a first signal indicative of an environment in which the autonomous vehicle is arranged; transmit, to the remote computing system, a sensing signal obtained from the sensor for determination of a second signal indicative of the environment in which the autonomous vehicle is arranged; and receive, from the remote computing system, a restriction command when the remote computing system determines that the first signal and the second signal do not correspond; and wherein the first signal is determined by the processor in the autonomous vehicle.

Preferably, the operation restriction includes at least one of: restricting travel of the autonomous vehicle, stopping the autonomous vehicle, and disabling a function of the autonomous vehicle.

Preferably, the processor is arranged to process a sensing signal obtained from a sensor on the autonomous vehicle to determine the first signal.

Preferably, the sensor providing the sensing signal to be processed to provide the first signal and the sensor providing the sensing signal to be processed to provide the second signal are of the same type, and are arranged to sense an environment in which the autonomous vehicle is arranged.

More preferably, the sensor providing the sensing signal to be processed to provide the first signal is the sensor providing the sensing signal to be processed to provide the second signal. The sensor may comprise an optical sensor, an electric sensor, an electromagnetic sensor or an ultrasonic sensor.

In a preferred embodiment of the fourth aspect, the remote computing system comprises a cloud computing system.

Preferably, the communication module is arranged to: receive, from the remote computing system, a control command to control operation of the autonomous vehicle when the remote computing system determines that the first signal corresponds to the second signal; wherein the control command comprises a response to be performed by the autonomous vehicle that is responsive to the environment in which the autonomous vehicle is arranged.

In the fifth aspect, the present invention provides a method comprising the method of the first and third aspects.

In the sixth aspect, the present invention provides a system comprising the system of the second and fourth aspects.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

Figure 1:
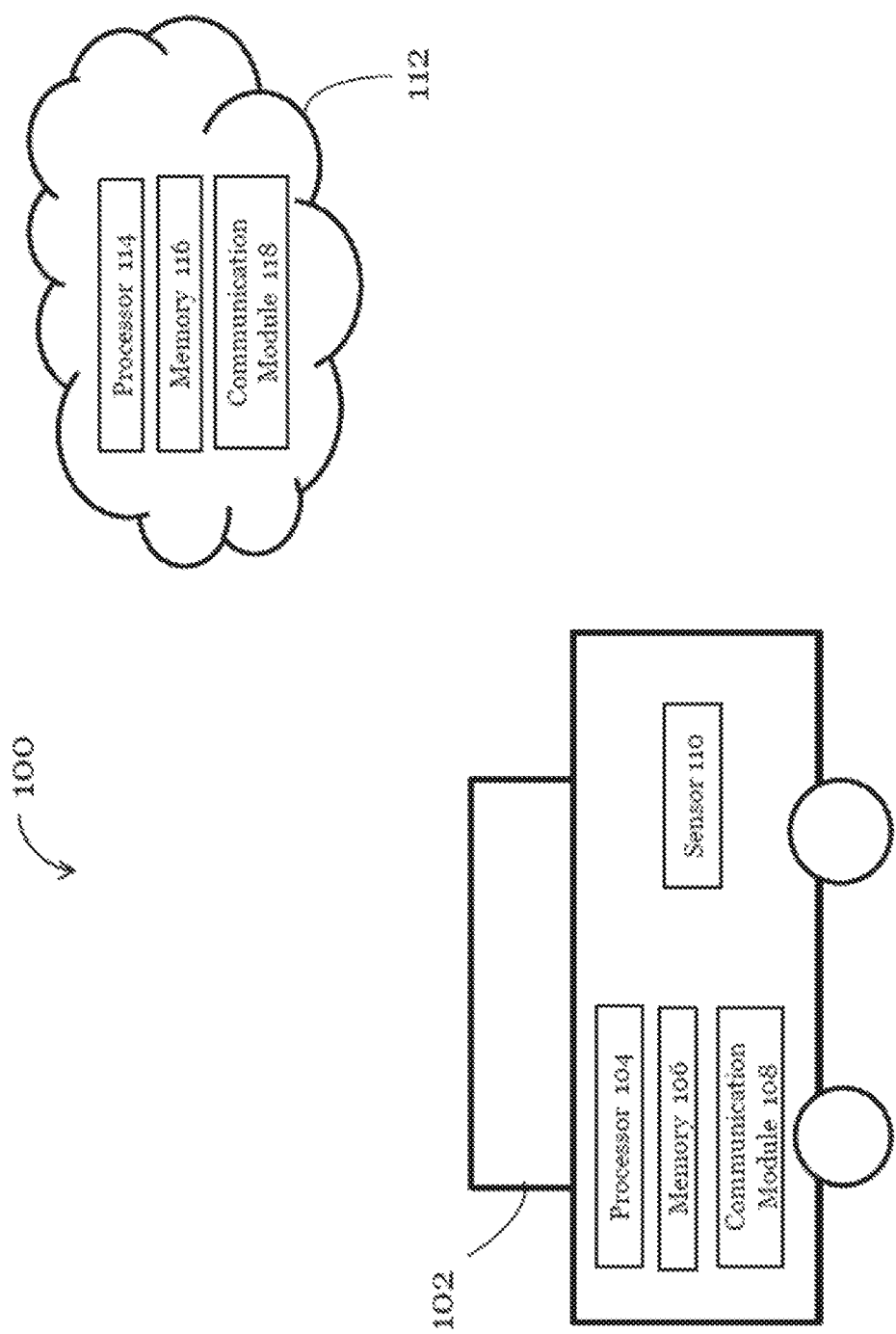
FIG. 1 is a schematic diagram of a system for controlling operation of an autonomous vehicle according to one embodiment of the invention.

FIG. 1 shows a schematic diagram of a system 100 for controlling operation of an autonomous vehicle 102 according to one embodiment of the invention. The system 100 includes a processor 114 at a remote computing system 112 operably connected with a processor 104 in the autonomous vehicle 102. The processor 104 in the autonomous vehicle 102 is arranged to determine a first signal indicative of an environment in which the autonomous vehicle 102 is arranged. The processor 114 in the remote computing system 112 is arranged to determine a second signal indicative of an environment in which the autonomous vehicle 102 is arranged.

Each of the first and second signals is determined based on the processing of a sensing signal obtained from a sensor 110 on the autonomous vehicle 102. The sensor 110 is arranged to sense an environment in which the autonomous vehicle 102 is arranged. The sensor 110 may be positioned at the front, side, or rear of the autonomous vehicle 102. the sensor 110 may be an optical sensor, an electric sensor, an electromagnetic sensor or an ultrasonic sensor. For example, the sensor 110 may be a camera, a LIDAR sensor, a SONAR sensor, GPS sensor, IMU sensor, motion sensor, etc. The system 100 further includes a communication module 108 in the autonomous vehicle 102 and a communication module 118 in the remote computing system 112 for communicating data, signals, and commands.

The remote computing system 112 is a cloud computing system. The processor 114 in the remote computing system 112 is arranged to compare the first signal with the second signal. If the processor 114 determines that the first signal and the second signal do not correspond to each other, the processor 114 would generate a restriction command to restrict the operation of the autonomous vehicle 102.

When the processing system in the autonomous vehicle 102 is compromised, abnormal operation may occur. By comparing, at the processor 114, the first signal determined at the autonomous vehicle 102 with the second signal determined at the remote computing system 112, any mismatch between the signals may suggest that the autonomous vehicle 102 is tampered, or is under cyberattacks. Responsive safety precaution or action can thus be executed to prevent occurrence of accidents.

In one application, upon determining a mismatch between the first and second signals, the operation restriction limits the travel of the autonomous vehicle 102. For example, the autonomous vehicle 102 may be forced to stop after travelling for a certain distance. The autonomous vehicle 102 may also be forced to park at the nearest available parking space, or other designated places. The operation restriction may also stop the autonomous vehicle 102 immediately, or disable a function of the autonomous vehicle 102. The disabling function may include setting an upper limit on the speed of travel, disabling acceleration of the vehicle 102, disabling the local processor 104 at the autonomous vehicle 102 to control the vehicle 102 using information processed in the cloud computing system 112.

If the processor 114 determines that the first signal and the second signal correspond to each other, the processor 114 then generates a control command to control the operation of the autonomous vehicle 102. The control command is a response to be performed by the autonomous vehicle 102, responsive to the environment in which the autonomous vehicle 102 is arranged. For example, the control command may contain instructions for continuing on the planned route, or taking actions to respond to the changes in environment (decelerate, turn, accelerate, etc.), or the like.

Figure 2:
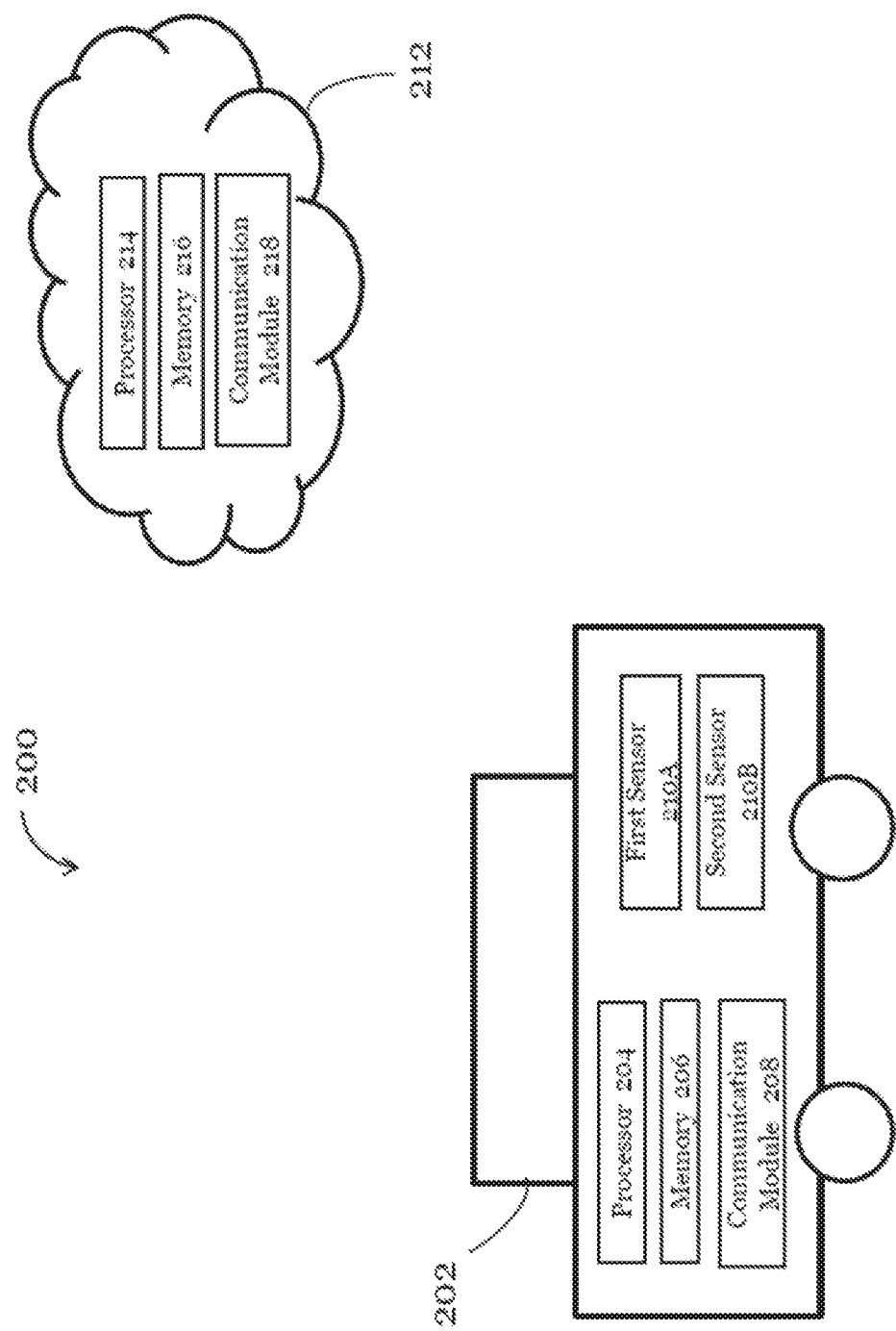
FIG. 2 is a schematic diagram of a system for controlling operation of an autonomous vehicle according to another embodiment of the invention.

FIG. 2 shows a schematic diagram of a system 200 for controlling operation of the autonomous vehicle 202 according to another embodiment of the invention. The system 200 is similar to the system 100 shown in FIG. 1. In system 200, the first signal is determined based on processing a sensing signal obtained from a first sensor 210A on the autonomous vehicle 202 and the second signal is determined based on processing a sensing signal obtained from a second sensor 210B on the autonomous vehicle 202. The first sensor 210a and second sensor 210b are duplicated sensors, i.e., they are of the same type. The sensors 210a, 210b are arranged to sense an environment in which the autonomous vehicle 202 is arranged. The first sensor 210a and the second sensor 210b may be placed adjacent each other, and may be positioned at the front, sides, or rear of the autonomous vehicle 202. The first and second sensors 210a, 210b may be optical sensors, electric sensors, electromagnetic sensors, or ultrasonic sensors. Example sensors include those described with respect to sensor 110.

Figure 3:
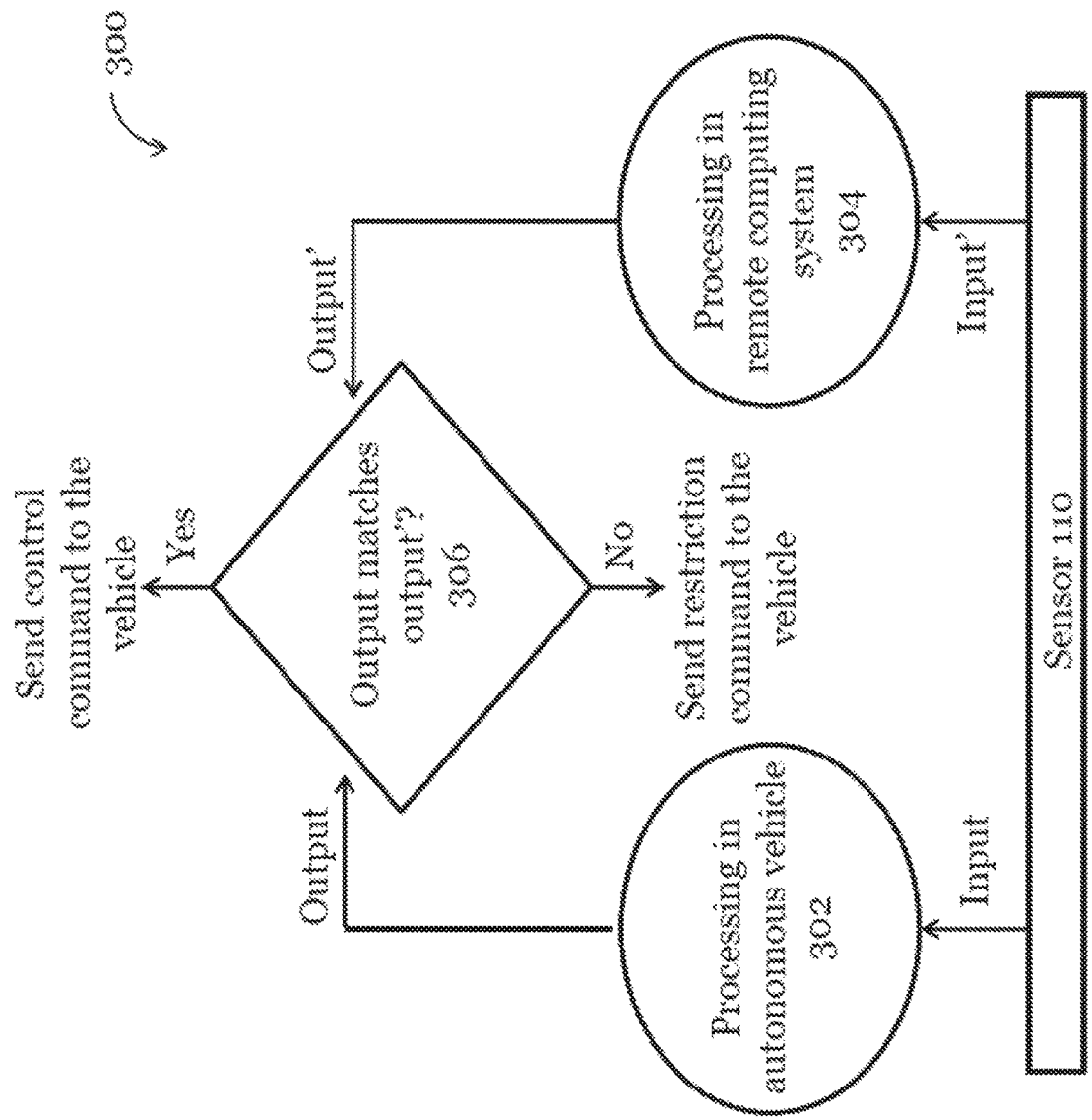
FIG. 3 is a flow diagram illustrating a method for controlling operation of an autonomous vehicle in FIG. 1.

FIG. 3 is a flow diagram illustrating a method 300 for controlling operation of the autonomous vehicle 102 in FIG. 1. In FIG. 3, the sensor 110 on the autonomous vehicle 102 provides a sensing signal to the processor 104 in the autonomous vehicle. In step 302, the processor 104 in the autonomous vehicle 102 then processes the sensing signal to determine a first signal indicative of the environment in which the autonomous vehicle is arranged. The sensor 110 on the autonomous vehicle also inputs the sensing signal to the processor 114 in a remote computing system 112. In step 304, and the processor 114 in the remote computing system 112 then processes the sensing signal to determine a second signal indicative of the environment in which the autonomous vehicle is arranged.

In the method 300, the first signal is then transmitted from the autonomous vehicle 102 to the remote computing system 112. In step 306, the processor 114 in the remote computing system 112 then compares the first signal with the second signal. The processor 114 may generate the restriction command (described above) to restrict the operation of the autonomous vehicle if the comparison indicates that the first signal and the second signal do not match. Alternatively, if the comparison indicates that the first and second signals match, the processor 114 in the remote computing system 112 generates a control command to the vehicle 102 to control its operation. The control command may be a response to be performed by the autonomous vehicle that is responsive to the environment in which the autonomous vehicle is arranged, as described above.

Figure 4:
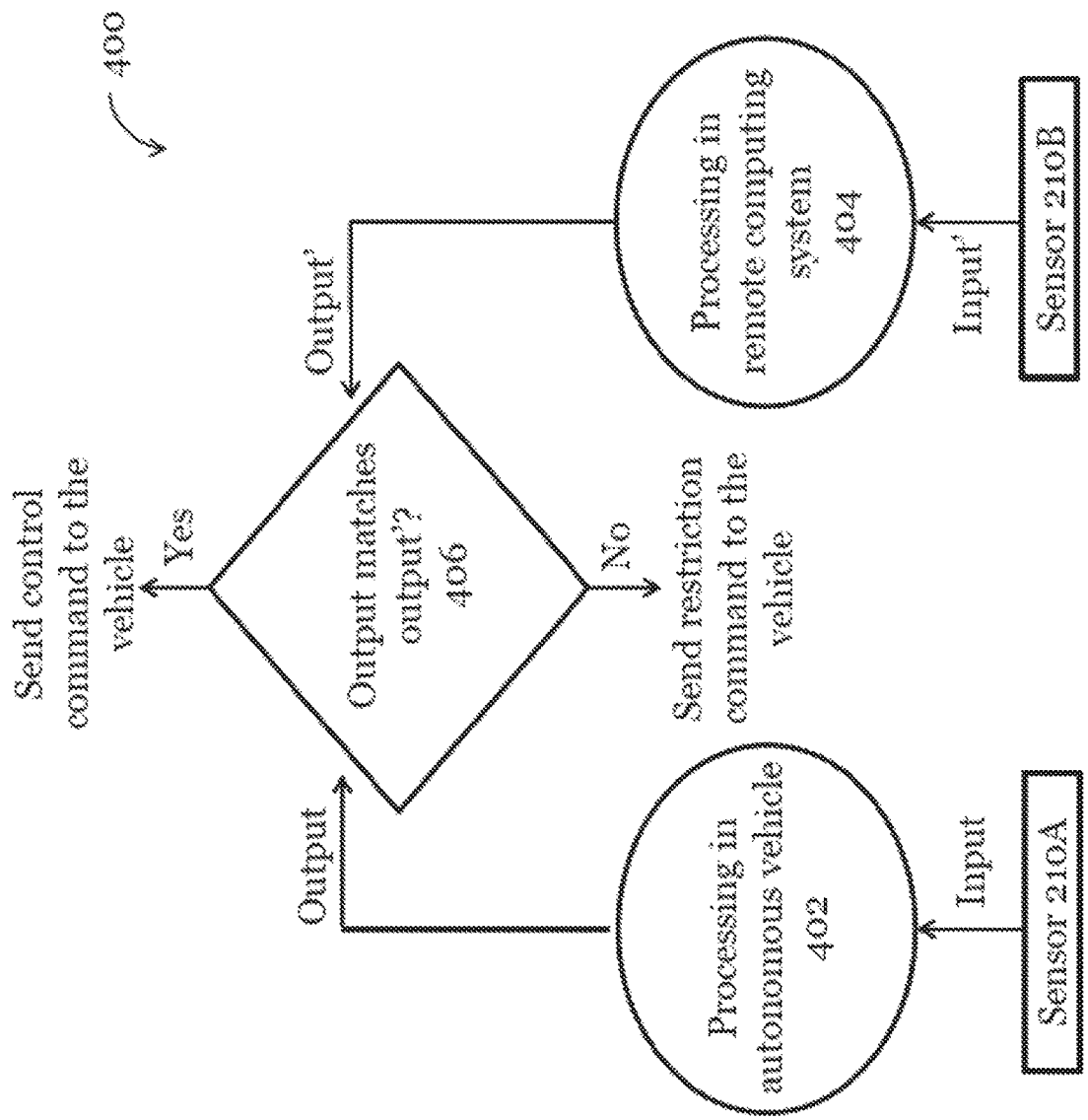
FIG. 4 is a flow diagram illustrating a method for controlling operation of an autonomous vehicle in FIG. 2.

FIG. 4 is a flow diagram illustrating a method 400 for controlling operation of the autonomous vehicle 202 in FIG. 2. The method 400 is similar to the method 300 shown in FIG. 3. The only difference is that two duplicated sensors 210A, 210B are used instead of one sensor in the example of FIGS. 1 and 3.

The remote computing system 112, 212 in FIGS. 1 and 2 can be a server or an information processing system. Preferably, the system 112, 212 may have different configurations, and it generally includes suitable components necessary to receive, store and execute appropriate computer instructions or codes. The main components of the system 112, 212 are a processing unit 114, 214 and a memory unit 116, 216. The processing unit 114, 214 is a processor such as a CPU, an MCU, etc. The memory unit 116, 216 may include a volatile memory unit (such as RAM), a non-volatile unit (such as ROM, EPROM, EEPROM and flash memory) or both. Preferably, the system 112, 212 further includes one or more input devices (not shown) such as a keyboard, a mouse, a stylus, a microphone, a tactile input device (e.g., touch sensitive screen) and a video input device (e.g., camera). The system 112, 212 may further include one or more output devices (not shown) such as one or more displays, speakers, disk drives, and printers. The displays may be a liquid crystal display, a light emitting display or any other suitable display that may or may not be touch sensitive. The system 112, 212 may further include one or more disk drives which may encompass solid state drives, hard disk drives, optical drives, flash drive, and/or magnetic tape drives. A suitable operating system may be installed in the system 112, 212, e.g., on the disk drive or in the memory unit 116, 216 of the system 112, 212. The memory unit 116, 216 and the disk drive may be operated by the processing unit 114, 214. The system 112, 212 also preferably includes a communication module 118, 218 for establishing one or more communication links (not shown) with one or more other computing devices in the autonomous vehicle such as a server, personal computers, terminals, wireless or hand-held computing devices. The communication module 118, 218 may be a modem, a Network Interface Card (NIC), an integrated network interface, a radio frequency transceiver, an optical port, an infrared port, a USB connection, or other interfaces (Wi-Fi, cellular network, ZigBee, Bluetooth, etc). The communication links may be wired or wireless for communicating commands, instructions, information and/or data. Preferably, the processing unit 114, 214, the memory unit 116, 216, and optionally the input devices, the output devices, the communication module 118, 218 and the disk drives are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the systems 112, 212 shown in FIGS. 1 and 2 are merely exemplary, and that alternative systems with different configurations are applicable.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments. The present embodiments are to be considered in all respects as illustrative and not restrictive.

For example, in some embodiments, the system may include more than one autonomous vehicle operably connected and communicative to the remote computing system and to each other. One or more connected autonomous vehicles may also be warned if the operation of one of the vehicles is determined to be abnormal. The processing may be performed distributively at the processors of the vehicle and the cloud. One or both of the restriction command and control command may be generated at the remote computing system then subsequently transmitted to the autonomous vehicle, or may be generated at the vehicle locally based on information received from the remote computing system. The sensor may include more than one sensor, meaning that the determination may be based on inputs from two or more types of sensors.

The invention claimed is:

1. A method for controlling operation of an autonomous vehicle, comprising:
    receiving, at a remote computing system operably connected with a processor in the autonomous vehicle, a first signal indicative of an environment in which the autonomous vehicle is arranged, the first signal being determined by the processor in the autonomous vehicle processing a sensing signal provided by a first sensor of the autonomous vehicle;
    receiving, at the remote computing system, a sensing signal provided by a second sensor of the autonomous vehicle;
    processing, at the remote computing system, the sensing signal provided by the second sensor of the autonomous vehicle to determine a second signal indicative of the environment in which the autonomous vehicle is arranged;
    comparing, at the remote computing system the first signal and the second signal;
    generating a restriction command to restrict operation of the autonomous vehicle if the comparison indicates that the first signal and the second signal do not correspond; and
    generating a control command to control operation of the autonomous vehicle if the comparison indicates that the first signal corresponds to the second signal, wherein the control command comprises a response to be performed by the autonomous vehicle that is responsive to the environment in which the autonomous vehicle is arranged.

2. The method of claim 1, wherein the operation restriction includes restricting travel of the autonomous vehicle.

3. The method of claim 1, wherein the operation restriction includes stopping the autonomous vehicle.

4. The method of claim 1, wherein the operation restriction includes disabling a function of the autonomous vehicle.

5. The method of claim 1, further comprising transmitting the first signal from the autonomous vehicle to the remote computing system.

6. The method of claim 1, wherein the generation of the restriction command is performed at the remote computing system.

7. The method of claim 6, further comprising transmitting the restriction command to the autonomous vehicle.

8. The method of claim 1, wherein the generation of the restriction command is performed at the autonomous vehicle.

9. The method of claim 1, wherein the first and second sensors are duplicated sensors of the same type, and are arranged to sense an environment in which the autonomous vehicle is arranged.

10. The method of claim 9, wherein each of the first and second sensors comprises an optical sensor, an electric sensor, an electromagnetic sensor or an ultrasonic sensor.

11. The method of claim 1, wherein the first and second sensors are provided by a single sensor.

12. The method of claim 11, wherein the single sensor comprises an optical sensor, an electric sensor, an electromagnetic sensor or an ultrasonic sensor.

13. The method of claim 1, wherein the remote computing system comprises a cloud computing system.

14. The method of claim 1, wherein the generation of the control command is performed at the remote computing system.

15. The method of claim 14, further comprising transmitting the control command to the autonomous vehicle.

16. The method of claim 1, wherein the generation of the control command is performed at the autonomous vehicle.

17. The method of claim 1, further comprising generating an alarm if the comparison indicates that the first signal and the second signal do not correspond.

18. A system for controlling operation of an autonomous vehicle, comprising:
a first processor at a remote computing system, operably connected with a second processor in the autonomous vehicle, and arranged to:
receive a first signal indicative of an environment in which the autonomous vehicle is arranged, the first signal being determined by the second processor in the autonomous vehicle processing a sensing signal provided by a first sensor of the autonomous vehicle;
receive a sensing signal provided by a second sensor of the autonomous vehicle;
process the sensing signal provided by the second sensor of the autonomous vehicle to determine a second signal indicative of the environment in which the autonomous vehicle is arranged;
compare the first and the second;
generate a restriction command to restrict operation of the autonomous vehicle if the comparison indicates that the first signal and the second signal do not correspond; and
generate a control command to control operation of the autonomous vehicle if the comparison indicates that the first signal corresponds to the second signal, wherein the control command comprises a response to be performed by the autonomous vehicle that is responsive to the environment in which the autonomous vehicle is arranged.

19. The system of claim 18, wherein the operation restriction includes:
restricting travel of the autonomous vehicle;
stopping the autonomous vehicle; or
disabling a function of the autonomous vehicle.

20. The system of claim 18, wherein the first and second sensors are duplicated sensors of the same type, and are arranged to sense an environment in which the autonomous vehicle is arranged.

21. The system of claim 20, wherein each of the first and second sensors comprises an optical sensor, an electric sensor, an electromagnetic sensor or an ultrasonic sensor.

22. The system of claim 18, wherein the first and second sensors are provided by a single sensor.

23. The system of claim 22, wherein the single sensor comprises an optical sensor, an electric sensor, an electromagnetic sensor or an ultrasonic sensor.

24. The system of claim 18, wherein the remote computing system comprises a cloud computing system.

25. The system of claim 18, further comprising the second processor in the autonomous vehicle.

* * * * *